United States Patent
Matsuyama et al.

(10) Patent No.: US 9,109,553 B2
(45) Date of Patent: Aug. 18, 2015

(54) FUEL INJECTOR

(71) Applicants: KAWASAKI JUKOGYO KABUSHIKI KAISHA, Kobe-shi, Hyogo (JP); JAPAN AEROSPACE EXPLORATION AGENCY, Chofu-shi, Tokyo (JP)

(72) Inventors: Ryusuke Matsuyama, Akashi (JP); Masayoshi Kobayashi, Akashi (JP); Atsushi Horikawa, Akashi (JP); Hitoshi Fujiwara, Chofu (JP)

(73) Assignees: KAWASAKI JUKOGYO KABUSHIKI KAISHA, Hyogo (JP); JAPAN AEROSPACE EXPLORATION AGENCY, Tokyo (JP)

( * ) Notice: Subject to any disclaimer, the term of this patent is extended or adjusted under 35 U.S.C. 154(b) by 51 days.

(21) Appl. No.: 13/908,578

(22) Filed: Jun. 3, 2013

(65) Prior Publication Data
US 2013/0327849 A1   Dec. 12, 2013

(30) Foreign Application Priority Data
Jun. 7, 2012   (JP) .................................. 2012-129682

(51) Int. Cl.
| F23R 3/14 | (2006.01) |
|---|---|
| F23R 3/34 | (2006.01) |
| F02M 23/12 | (2006.01) |
| F23R 3/28 | (2006.01) |

(52) U.S. Cl.
CPC .................. *F02M 23/12* (2013.01); *F23R 3/14* (2013.01); *F23R 3/286* (2013.01); *F23R 3/343* (2013.01); *Y02T 10/146* (2013.01)

(58) Field of Classification Search
CPC ................ F23R 3/10; F23R 3/14; F23R 3/16; F23R 3/18; F23R 3/286; F23R 3/343; F02M 23/12
USPC ......... 239/398, 399, 402, 403, 405, 406, 463, 239/466, 533.2; 60/734, 737, 738, 740, 60/742, 746–748
See application file for complete search history.

(56) References Cited

U.S. PATENT DOCUMENTS

| 5,647,538 | A | * | 7/1997 | Richardson ................... 239/405 |
|---|---|---|---|---|
| 5,816,049 | A | | 10/1998 | Joshi |
| 6,363,726 | B1 | | 4/2002 | Durbin et al. |

(Continued)

FOREIGN PATENT DOCUMENTS

| JP | 4162430 B2 | 10/2008 |
|---|---|---|
| JP | 4632392 B2 | 2/2011 |

*Primary Examiner* — Darren W Gorman
(74) *Attorney, Agent, or Firm* — Sughrue Mion, PLLC

(57) ABSTRACT

A fuel injector includes a pilot fuel injector, configured to inject the fuel into a combustion chamber, and a main fuel injector provided coaxially with the pilot fuel injector so as to surround the pilot fuel injector and configured to have a main flow path to generate a premixed air-fuel mixture. The main flow path includes an outer main air passage located radially outwardly and configured to supply a compressed air in an axial direction into an annular premixed air-fuel mixture passage, an inner main air passage located radially inwardly and configured to supply the compressed air into the premixed air-fuel mixture passage from a radially inner side. The injector further includes a main fuel injection port to inject the fuel from an axially upstream side into the inner main air passage.

6 Claims, 4 Drawing Sheets

(56) References Cited

U.S. PATENT DOCUMENTS

| | | |
|---|---|---|
| 6,381,964 B1 | 5/2002 | Pritchard, Jr. et al. |
| 6,418,726 B1 | 7/2002 | Foust et al. |
| 2006/0021350 A1* | 2/2006 | Sanders ......................... 60/743 |
| 2007/0289305 A1* | 12/2007 | Oda et al. ...................... 60/748 |
| 2008/0302105 A1* | 12/2008 | Oda et al. ...................... 60/737 |
| 2010/0308135 A1* | 12/2010 | Yamamoto et al. ........... 239/402 |

\* cited by examiner

FUEL INJECTOR

CROSS REFERENCE TO THE RELATED APPLICATIONS

This application claims priority to Japanese patent application No. 2012-129682, filed Jun. 7, 2012, the disclosure of which is incorporated by reference in its entirety into this application.

BACKGROUND OF THE INVENTION

1. Field of the Invention

The present invention relates to a fuel injector for use in, for example, a gas turbine engine and, more particularly, to the fuel injector equipped with a complex fuel injector comprised of a plurality of fuel nozzles.

2. Description of Related Art

In recent years, in consideration of the environment, there is a need for a reduction of emissions such as NOx (nitrogen oxide) emitted from gas turbine engines. A fuel injector of the conventional aircraft gas turbine combustor is of a diffusive combustion type, and since in the diffusion combustion, the burning reaction takes place based on the stoichiometric mixture ratio, the flame temperature tends to increase. Considering that the emission of NOx is known to exponentially increase with the increase of the flame temperature, lowering of the flame temperature appears to effectively suppress the emission of NOx. However, in the current situation of the propensity for high temperature and high pressure in the gas turbine, further suppression of the emission of NOx with the conventional diffusive combustion method is limited.

In order to lower the flame temperature, a fuel injector of a lean premixed combustion method is considered effective. The lean premixed combustion method is known to be a method of burning an air-fuel mixture in which the ratio of fuel relative to air is lowered, and the lean combustion according to this method contributes to a considerable reduction of the flame temperature as compared with that afforded by the conventional diffusive combustion method. On the other hand, however, the lean premixed combustion method tends to result in an instable and incomplete combustion of the air-fuel mixture because of the relatively low flame temperature. In view of this, a concentric fuel injector has been used to realize a low NOx emission, in which while a pilot fuel injector is located on an inner side and a main injector is located coaxially with, and outer side of the pilot fuel injector. In the concentric fuel injector, the diffusive combustion method with the pilot fuel injector is used to maintain a stable combustion at a low power operation, while the lean premixed combustion method with the main fuel injector is used in addition to the diffusive combustion with the pilot fuel injector at a high power operation.

With the concentric fuel injector referred to above, fuel is injected into a stream of air to form a premixed air-fuel mixture within a premix flow path of the main fuel injector so that the above discussed lean combustion may be realized by burning the premixed air-fuel mixture within a combustion chamber. As the structure necessary for the fuel to be injected into the stream of air, a structure in which a fuel injection unit is located in a wall surface of the air flow path and the fuel is injected towards an outer diameter side or an inner diameter side (such as addressed in the patent documents 1 and 2 listed below), a structure in which fuel injection units are located in between two air flow paths located on an inner diameter side and an outer diameter side, respectively, and fuel is injected into both of those air flow paths (such as addressed in the patent document 3 listed below), and a structure in which of the two air flow paths located on an inner diameter side and an outer diameter side, respectively, a fuel injection unit is located outside the air flow path on the outer diameter side so that the fuel may be injected into the air flow path on the outer diameter side so as to flow towards the inner diameter side (such as addressed in the patent document 4 listed below), have been suggested.

PRIOR ART DOCUMENTS

Patent Documents

[Patent Document 1] Japanese Patent No. 4632392
[Patent Document 2] Japanese Patent No. 4162430
[Patent Document 3] U.S. Pat. No. 6,363,726
[Patent Document 4] U.S. Pat. No. 5,816,049

SUMMARY OF THE INVENTION

It has, however, been found that with the device disclosed in any of the patent documents 1 and 2 listed above, since the distance of introduction of fuel to the air flow path is short, the fuel distribution tends to be biased towards the neighborhood of the wall surface of the air flow path, failing to form the lean premixed air-fuel mixture having a uniform distribution. Also, with the device disclosed in the patent document 3 listed above, the respective fuel distributions of the premixed air-fuel mixture from the respective passages are apt to overlap one above the other and, therefore, formation of the lean air-fuel mixture having a uniform distribution is difficult to achieve after all. In addition, with the device disclosed in the patent document 4 listed above, since the fuel injection unit is located in an outermost peripheral portion of the fuel injector, reduction of the outer diameter dimension of the device is impossible to achieve.

In order to resolve the above discussed problems and inconveniences inherent in the prior art fuel injectors, the present invention has for its object to provide a fuel injector of a kind in which while an undesirable increase in radial dimension is suppressed, a premixed air-fuel mixture having an extremely uniform fuel distribution may be formed to reduce the NOx and also to hold flames stably.

In order to accomplish the foregoing object of the present invention, there is provided a fuel injector, which includes a pilot fuel injector configured to inject the fuel into a combustion chamber; and a main fuel injector provided coaxially with the pilot fuel injector so as to surround the pilot fuel injector and configured to have a main flow path for generating a premixed air-fuel mixture. The main flow path includes an outer main air passage, located radially outwardly and configured to supply a compressed air in an axial direction into an annular premixed air-fuel mixture passage, and an inner main air passage located radially inwardly and configured to supply the compressed air into the premixed air-fuel mixture passage from a radially inner side. A main fuel injection port is further provided to inject the fuel from an axially upstream side into the inner main air passage.

According to the present invention summarized above, the compressed air flowing from the outer main air passage in a longitudinal axis direction is mixed with fuel injected into a stream of the compressed air flowing in a radial direction and, therefore, the premixing may be facilitated within the main passage to form a lean premixed air-fuel mixture having a fuel distribution that is extremely uniform. In other words, since the fuel having a principal component in a shaft direction is injected at a large angle relative to the air flowing through the inner main air passage and having a principal component in the radial direction and, after mixing has been taken place, the resultant air-fuel mixture having a principal component in the radial direction is merged with the air, flowing through the outer main air passage and having a principal component in the shaft direction, in a fashion crossing the latter, the fuel and the air are sufficiently premixed in a relatively short distance. Also, the main fuel injection port through which the fuel is injected is located radially inwardly of the main fuel injector and, therefore, the undesirable increase of the radial dimension of the device in its entirety may be suppressed.

In an embodiment of the present invention, the fuel injector may also include a guide air supply passage operable to inject the compressed air into the inner main air passage from the axially upstream side so as to follow the fuel flow from the main fuel injection port. In such a case, for example, a main fuel injection block that defines the main fuel injection port and is located so as to confront an axially extending throughhole defined in an upstream side wall of the inner main air passage may be further provided and the guide air supply passage may be formed as a gap delimited between the main fuel injection block and the throughhole. According to the use of the guide air supply passage referred to above may be effective for the air, supplied from the guide air supply passage, to prevent the fuel from adhering to a wall surface of the air passage and/or the main flow path to thereby avoid a burnout of the wall surface and to assuredly form the further uniformly premixed air-fuel mixture.

In another embodiment of the present invention, a plurality of the main fuel injection ports may be located along a circumferential direction. According to the use of the plurality of the main fuel injection ports in the fuel injector, the premixed air-fuel mixture having a further uniform fuel distribution may be formed.

In a further embodiment of the present invention, a swirler for swirling the compressed air about the longitudinal axis may be provided in at least one of the inner main air passage and the outer main air passage. The use of the swirler may make the compressed air swirling about the longitudinal axis to form the premixed air-fuel mixture having a further uniform fuel distribution.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
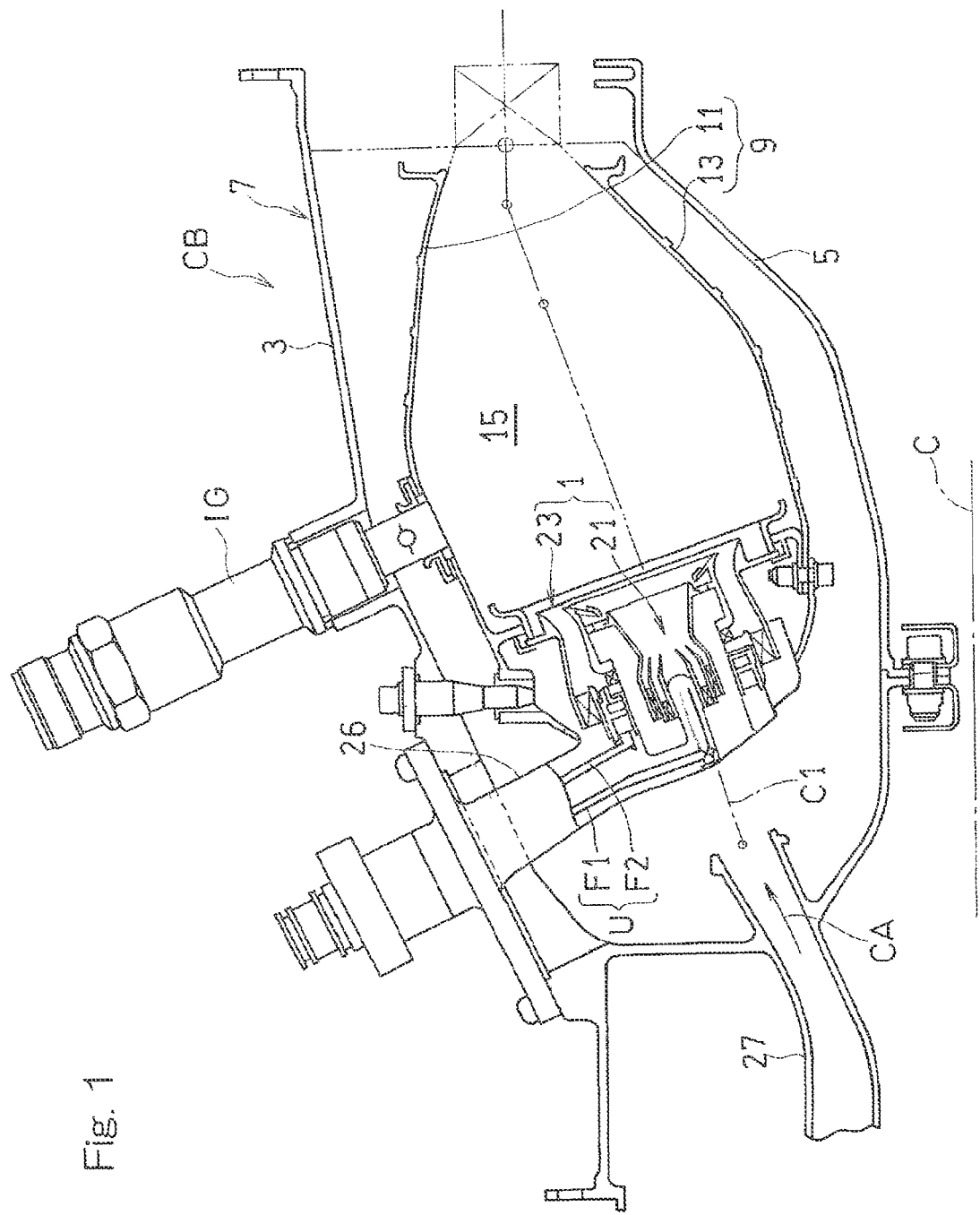
FIG. 1 is a sectional view showing a combustor for a gas turbine engine equipped with a fuel injector designed in accordance with an embodiment.

Hereinafter, embodiments of the present invention will be described in detail with reference to the accompanying drawings. FIG. 1 illustrates a combustor CB for a gas turbine engine equipped with a fuel injector 1 designed in accordance with an embodiment of the present invention. The combustor CB is operable to mix fuel with a compressed air CA, fed from a compressor (not shown) of the gas turbine engine, and burn the resultant air-fuel mixture to produce high temperature and high pressure combustion gases, which are in turn fed to a turbine to drive this turbine.

The combustor CB is of an annular configuration and includes an annular outer casing 3 and an inner casing 5 located radially inner side of the outer casing 3, which casings 3 and 4 are positioned in a coaxial relation with an engine rotary longitudinal axis C so as to form a combustor housing 7 having an annular inner space defined therein. The annular inner space of the combustor housing 7 accommodates therein an annular combustion liner 9 in a coaxial relation with the combustor housing 7. The combustion liner 9 is made up of an annular outer liner 11 and an annular inner liner 13 coaxially located inwardly of the annular outer liner 11 and has an annular combustion chamber 15 defined therein. The combustion liner 9 has a top wall provided with a plurality of fuel injectors 1 for injecting fuel into the combustion chamber 15, which devices 1 are arranged coaxially with the engine rotary longitudinal axis C and spaced equidistantly from each other in a direction circumferentially of the combustion liner 9.

Each of the fuel injectors 1 includes a pilot fuel injector 21 and a main fuel injector 23. The main fuel injector 23 is so positioned in a round row as to surround an outer periphery of the pilot fuel injector 21 in a coaxial relation with a longitudinal axis C1 of the pilot fuel injector 21 and generate a premixed air-fuel mixture. Each of the fuel injectors 1 is supported by the combustor housing 7 by means of a stem portion 26 secured to the combustor housing 7. An ignition plug IG for ignition extends through the outer casing 3 and the outer liner 11 and is located so as to face in a direction radially of the combustion liner 9 with its igniting end positioned in the vicinity of the fuel injector 1.

The compressed air CA, fed from the compressor, is introduced into the annular inner space of the combustor housing 7 through a plurality of air intake tubes 27 that are positioned spaced equidistantly in a circumferential direction thereof about the engine rotary longitudinal axis C. The compressed air CA so introduced into the annular inner space is supplied to the fuel injectors 1 and also into the annular combustion chamber 15 through a plurality of air intake ports each defined in the outer and inner liners 11 and 13 of the combustion liner 9. The stem portion 26 referred to previously forms a fuel piping unit U. This fuel piping unit U includes a first fuel supply system F1 for supplying fuel to the pilot fuel injector 21 for the diffusive combustion and a second fuel supply system F2 for supplying fuel to the main fuel injector 23 for the combustion of a lean premixed air-fuel mixture.

Figure 2:
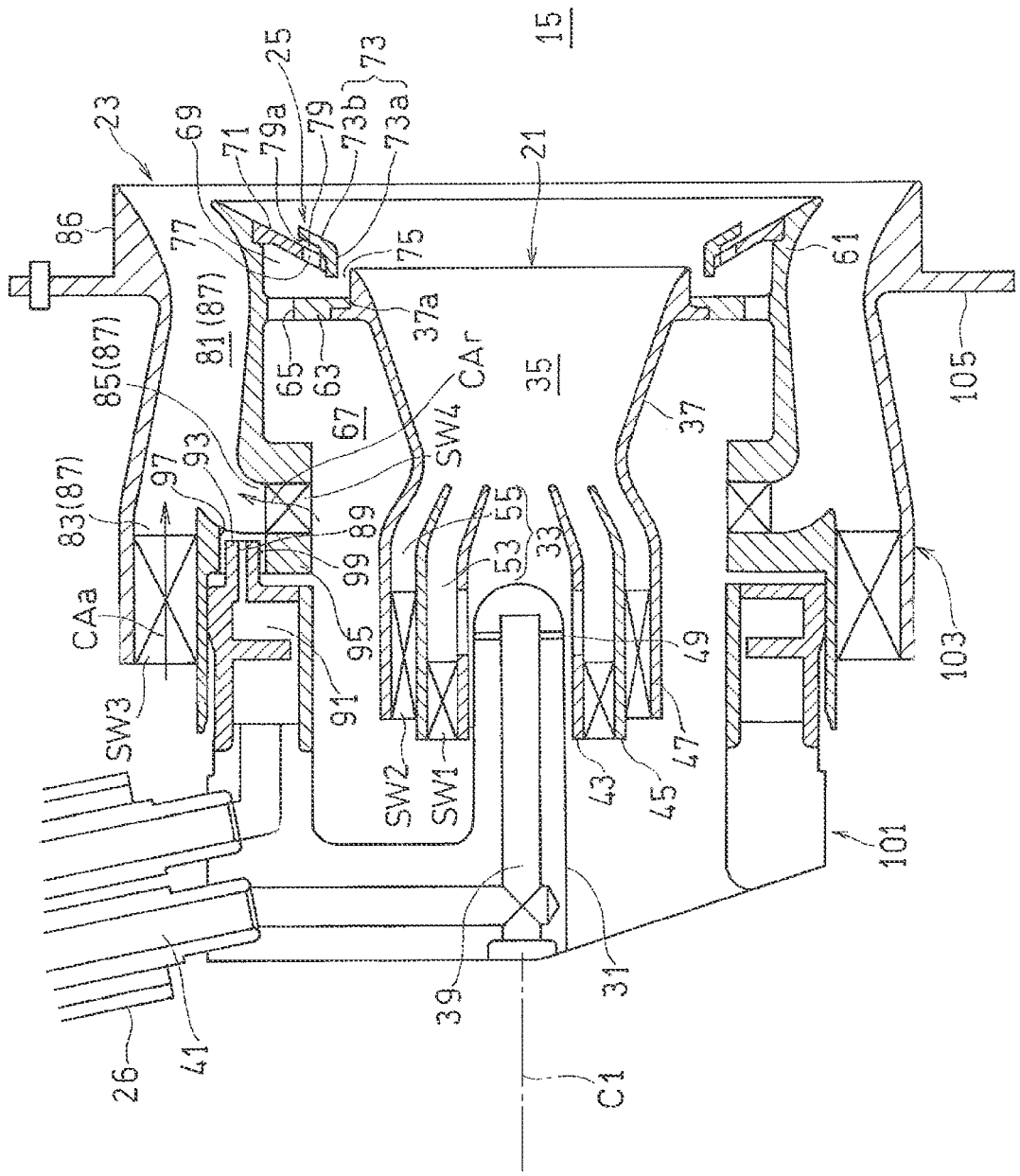
FIG. 2 is a sectional view of the fuel injector designed in accordance with an embodiment.

The detailed structure of the fuel injectors 1 is shown in FIG. 2. The fuel injector 1 includes, as hereinabove described, the pilot fuel injector 21 positioned at a radially center position, and the main fuel injector 23 located radially outwardly of the fuel injector 1, that is, on an outer periphery side of the pilot fuel injector 21 and also includes an air injection unit 25 provided at a location intermediate between an outlet end of the pilot fuel injector 21 and the main fuel injector 23.

The pilot fuel injector 21 includes a pilot fuel injection block 31 coupled with the stem portion 26 to inject the fuel, an air supply unit 33 provided radially outwardly of the pilot fuel injection block 31 for supplying the compressed air CA, and a tapered pilot nozzle 37 that defines a pilot flow path 35 for premixing fuel fed from the pilot fuel injection block 31, with the compressed air CA fed from the air supply unit 33, and then injecting the resultant premix into the combustion chamber 15. A fuel supply passage 39 that defines a flow path of the fuel is formed at a radially center location within the pilot fuel injection block 31. The fuel supply passage 38 of the pilot fuel injection block 31 referred to above is communicated with a first fuel introducing passage 41 forming a flow path of the fuel.

More specifically, an inner tubular body 43 is located radially outwardly of the pilot fuel injection block 31, an outer tubular body 45 is located radially outwardly of the inner tubular body 43, and a cylindrical pilot shroud 47 having a downstream end portion formed as the pilot nozzle 37 referred to previously is located radially outwardly of the outer tubular body 45. By this pilot shroud 47, the pilot fuel injector 21 and the air injection unit 25 on an outer side are defined separately from each other. Each of the inner tubular body 43 and the end portion (downstream end portion) of the outer tubular body 45 is tapered in a downward direction so as to have a corresponding reduced diameter.

The pilot fuel injection block 31 includes a plurality of radially extending fuel injection ports 49. Also, an inner pilot air passage 53 is formed between the inner tubular body 43 and the outer tubular body 45 and an outer pilot air passage 55 is formed between the outer tubular body 45 and the pilot shroud 47. Those air passages 53 and 55 cooperate with each other to define the air supply unit 33 referred to previously and have respective upstream portions provided with an inner pilot swirler SW1 and an outer pilot swirler SW2 both operable to swirl the compressed air CA about a longitudinal axis. Accordingly, the fuel injected from the fuel injection port 49 is supplied towards the downstream side together with the compressed air CA supplied from the air passages 53 and 55.

The air injection unit 25 referred to above is formed between the pilot shroud 47 and an inner main shroud 61 located radially outwardly of the pilot shroud 47 so as to define an inner peripheral wall of the main fuel injector 23. The pilot shroud 47 of the pilot fuel injector 21 and the inner main shroud 61 of the main fuel injector 23 are connected together by an annular partition wall 63. The partition wall 63 is formed integrally with the inner main shroud 61 and is located at an axial position in the vicinity of an outlet end portion 37a of the pilot nozzle 37 of the pilot shroud 47. This partition wall 63 has a plurality of discharge ports 65, each in the form of an axially extending throughhole, which are distributed at respective circumferential locations. Accordingly, the compressed air CA having passed through a compressed air passage 67 for the compressed air CA, which passage 67 is defined at a location upstream side of the partition wall 63, by way of the discharge ports 65 is guided towards a reservoir space 69 formed at a location downstream side of the partition wall 63.

The inner main shroud 61, forming a part of the air injection unit 25, has a downstream end portion so shaped as to have a diameter increasing towards the downstream side. This downstream end portion of the inner main shroud 61 is provided with an annular partition wall plate 71 inclined radially inwardly in an upstream direction. The combustion chamber 15 and the air injection unit 25 are separated from each other by the partition wall plate 71. This partition wall plate 71 has an inner diameter side end portion having a flame stabilization plate 73 fitted thereto.

Figure 3:
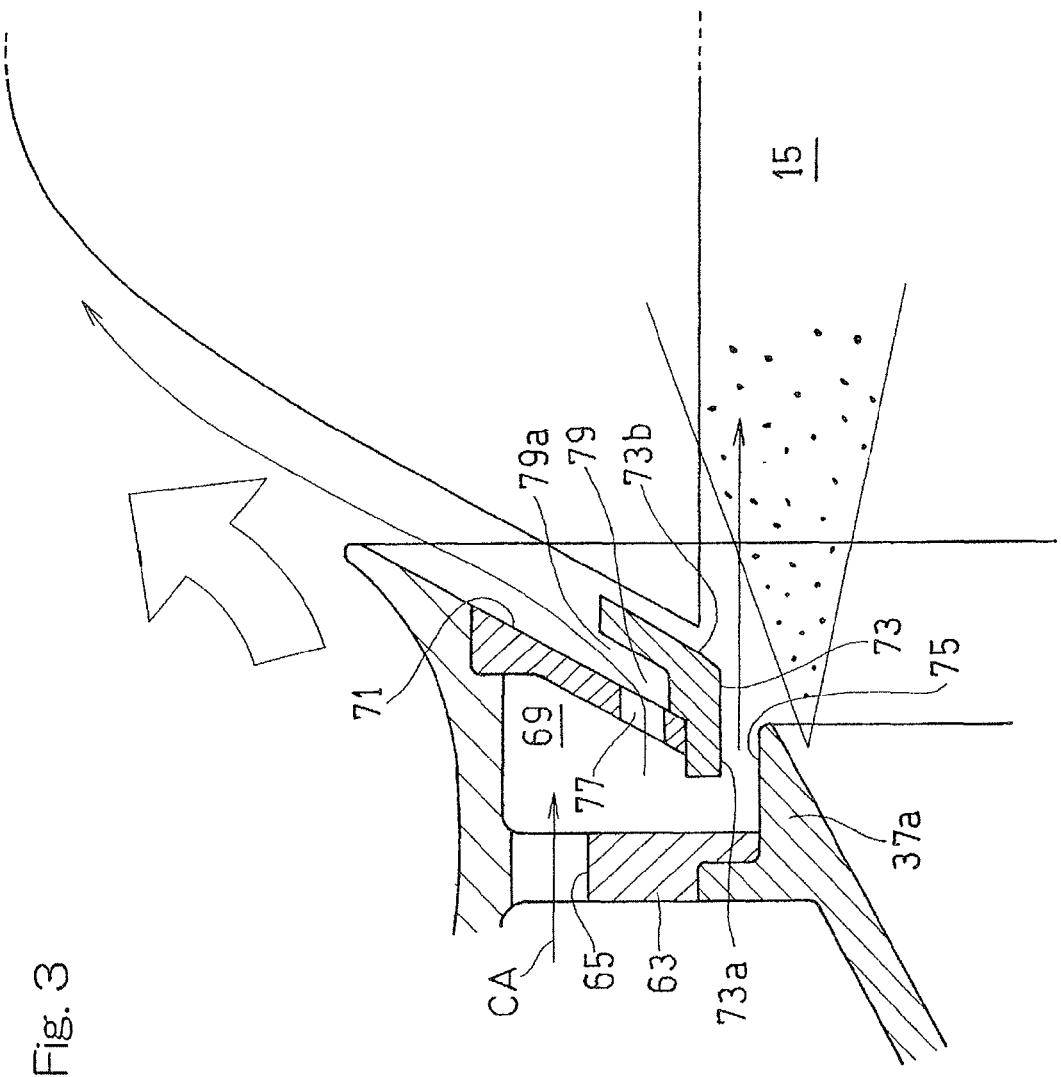
FIG. 3 is a sectional view showing, on an enlarged scale, an air injection unit shown in FIG. 2.

This flame stabilization plate 73 is made up of an axially extending tubular peripheral wall portion 73a and an inclined portion 73b extending from a downstream end of the peripheral wall portion 73a towards the downstream side so as to have an increased diameter. In other words, the inclined portion 73b of the flame stabilization plate 73 is inclined radially outwardly and downstream with respect to the axis. The peripheral wall portion 73a of the flame stabilization plate 73 is secured to the inner diameter side end portion of the partition wall plate 71. Also, as best shown in FIG. 3, the inclined portion 73b of the flame stabilization plate 73 extends at such an angle of inclination as to extend substantially parallel to the partition wall plate 71, and is spaced a distance from the partition wall plate 71 with a gap defined between the inclined portion 73b and the partition wall plate 71. In other words, the inclined portion 73b of the flame stabilization plate 73, while the gap is defined between the inclined portion 73b and the partition wall plate 71 as described above, covers the downstream side of the inner diameter side end portion of the partition wall plate 71.

A radially extending annular gap is defined between the flame stabilization plate 73 and the downstream end portion of the pilot nozzle 37, and this annular gap defines an inner diameter side air injection opening 75, which is a first opening open towards the downstream side. Also, a portion of the partition wall plate 71, which is covered by the flame stabilization plate 73, is formed with an outer diameter side air injection opening 77, which is a second opening that extends axially. A portion of the compressed air CA discharged into the reservoir space 69 is injected axially from the inner diameter side air injection opening 75 into the combustion chamber 15 and the remaining portion of such compressed air CA is, after having passed through the outer diameter side air injection opening 77 into a inflow space 79, which is a gap defined between the partition wall plate 71 and the flame stabilization plate 73, injected radially outwardly from an injection port 79a, which is a downstream end of the inflow space 79, into the combustion chamber 15.

As shown in FIG. 2, the main fuel injector 23 has an annular premixed air-fuel mixture passage 81 for discharging and injecting the premixed air-fuel mixture towards the combustion chamber 15, an outer main air passage 83 for supplying a compressed air CAa from an axially upstream side into the premixed air-fuel mixture passage 81, and an inner main air passage 85 for supplying a compressed air CAr into the premixed air-fuel mixture passage 81 from an radially inner side towards a radially outer side. A cylindrical outer main shroud 86 forming a main nozzle is located coaxially on an outer side of the inner main shroud 61, and the premixed air-fuel mixture passage 81 is formed between the inner main shroud 61 and the outer main shroud 86. The premixed air-fuel mixture passage 81, the outer main air passage 83 and the inner main air passage 85 altogether forms a main flow passage 87 for generating a premixed air-fuel mixture in the main fuel injector 23. The outer main air passage 83 and the inner main air passage 85 are provided with an outer main swirler SW3, which is an axial swirler, and an inner main swirler SW4, which is a radial swirlar, respectively, for swirling the associated compressed air CAa and CAr about corresponding longitudinal axes.

The main fuel injector 23 is provided with a plurality of main fuel injection ports 89 for injecting fuel from an axially upstream side into the inner main air passage 85. The plurality of those main fuel injection ports 89 are located radially inwardly of the outer main air passage 83 and equidistantly spaced from each other in a circumferential direction about the longitudinal axis C1. Each of those main fuel injection ports 89 is formed as a throughhole provided at a center portion of a main fuel injection block 93 of, for example, a columnar shape so as to protrude from an annular fuel introducing chamber 91 towards an axially downstream side.

Figure 4:
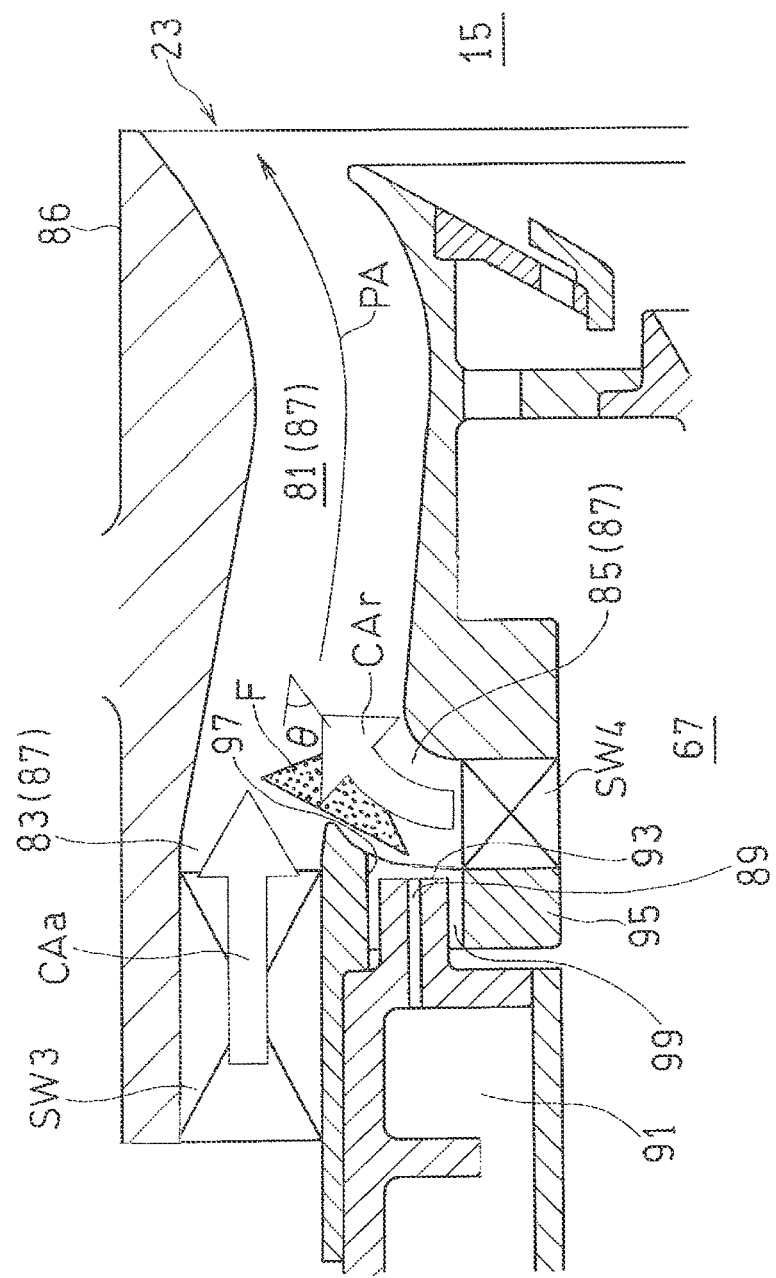
FIG. 4 is a sectional view showing, in an enlarged scale, a main fuel injector shown in FIG. 2.

Also, the main fuel injection block 93 is positioned so as to confront an axially extending throughhole 97, which is defined in a flanged partition wall 95 forming a front wall (upstream side wall) of the inner main air passage 85. As shown in FIG. 4, an annular gap delimited between the main fuel injection block 93 and each of the throughholes 97 in the flanged partition wall 95, both so formed as described above, is communicated with an air passage, external to the fuel injector 1, and the compressed air passage 67 so as to define a guide air supply passage 99 for injecting the compressed air CA from the upstream side of the longitudinal axis direction into the inner main air passage 85. In other words, the guide air supply passage 99 is operable to inject the compressed air CAr from the upstream side of the longitudinal axis direction into the inner main air passage 85 so as to follow the fuel flow F from a main fuel injection port 89 in the main fuel injection block 93.

As shown in FIG. 2, in the fuel injector 1, a first injector unit 101, which is an upstream side structural body including the pilot injection block 31 of the pilot fuel injector 21 and the main injection block 93 of the main fuel injector 23, is supported by a combustor housing 3 by means of a stem portion 27 and a second injector unit 103, which is a downstream side structural body including the pilot nozzle 37 and the main nozzle referred to above is supported by the annular combustion liner 9 through a support flange 105 provided in an outer periphery of the downstream end portion of the outer main shroud 86. The first injector unit 101 and the second injector unit 103 are separately assembled and, after the assemblage of each of those units 101 and 103, the first injector unit 101 is mounted on the second injector unit 103 to complete the fuel injector 1. In this way, the first injector unit 101 is so formed as to be detachable relative to the second injector unit 103.

Hereinafter, the operation of the fuel injector 1 of the structure described hereinabove will be described. As shown in FIG. 4, the compressed air CAa flows axially from the outer main air passage 83 into the premixed air-fuel mixture passage 81 and the compressed air CAr, which has been mixed with fuel F, flows radially outwardly and diagonally (in a downstream direction) from the inner main air passage 85 into the premixed air-fuel mixture passage 81. Those compressed air streams CAa and CAr flow at a crossing angle θ within the range of 15° to 70°. Since as described above the compressed air CAr mixed with the fuel F is mixed with the compressed air CAa, fed through the outer main air passage 83, within the main passage 87, the premixing within the main passage 87 is enhanced to form a lean premixed air-fuel mixture PA in which the fuel is extremely uniformly distributed.

In other words, partly because the fuel F having a principal component in the axial direction is injected at a large angle of substantially 90° relative to the compressed air CA flowing in the inner main air passage 85 and having a principal component in the radial direction and partly because, after the both have been mixed together, the resultant air-fuel mixture having a principal component in the radial direction crosses the compressed air CAa, flowing in the outer main air passage 83 and having a principal component in the axial direction, at a large angle of 15° to 70°, the fuel and the air may be sufficiently premixed together in a relatively short distance. Also, since the main fuel injection ports 89 are positioned in the circumferential direction, the premixed air-fuel mixture having a further uniform fuel distribution may be formed. Moreover, since the main fuel injection block 93 for injecting the fuel F is located radially inwardly of the main fuel injector 23, an undesirable increase of the radial dimension of the device 1 in its entirety may be suppressed. A ratio Q1/Q2 is preferably in the range of 3/7 to 7/3, where Q1 represents a flow quantity of the compressed air CAr flowing through the inner main air passage 85 and Q2 represents a flow quantity of the compressed air CAa flowing through the outer main air passage 83. When the flow quantity ratio Q1/Q2 is set in this range, the flow quantity ratio does not become unbalanced. As a result, the fuel concentration does not become high locally. On this account, the flame temperature at the time of the combustion can be suppressed to a low level, and the generation of the NOx can be suppressed. In addition, the damages on the wall surface by flashback or auto ignition under high temperature and pressure can be avoided.

Furthermore, since the guide air supply passage 99 injects a portion of the compressed air CAr from the axially upstream side into the inner main air passage 85, the fuel is prevented from impinging upon a wall surface of the main passage 87 to avoid an undesirable burnout in the wall surface and also to facilitate the formation of the assuredly uniformly premixed air-fuel mixture.

Yet, since the outer main swirler SW3 and the inner main swirler SW4 both operable to swirl the compressed air about the longitudinal axis, are provided respectively within the outer main air passage 83 and the inner main air passage 85, the compressed air is formed as a swirling flow about the longitudinal axis and, therefore, the premixed air-fuel mixture having a further uniform fuel distribution may be obtained. It is, however, to be noted that in the practice of the present invention either the swirler in the outer main air passage 83 or the swirler in the inner main air passage 85 may be dispensed with. The main fuel injector 23 may be provided with a plurality of the outer main swirlers SW3, which are arranged, for example, next to each other in the radial direction. Similarly, the main fuel injector 23 may be provided with a plurality of the inner main swirlers SW4, which are arranged, for example, next to each other in the axial direction.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:
1. A fuel injector comprising:
   a pilot fuel injector configured to inject the fuel into a combustion chamber; and
   a main fuel injector provided coaxially with the pilot fuel injector so as to surround the pilot fuel injector and configured to have a main flow path to generate a premixed air-fuel mixture,
      the main flow path including an outer main air passage, located radially outwardly and configured to supply a compressed air in an axial direction into an annular premixed air-fuel mixture passage, and an inner main air passage located radially inwardly and configured to supply the compressed air into the premixed air-fuel mixture passage from a radially inner side towards a radially outer side, and
   a main fuel injection port to inject the fuel in the axial direction from an axially upstream side into the inner main air passage.

2. A fuel injector comprising:
a pilot fuel injector configured to inject the fuel into a combustion chamber; and
a main fuel injector provided coaxially with the pilot fuel injector so as to surround the pilot fuel injector and configured to have a main flow path to generate a premixed air-fuel mixture,
the main flow path including an outer main air passage, located radially outwardly and configured to supply a compressed air in an axial direction into an annular premixed air-fuel mixture passage, and an inner main air passage located radially inwardly and configured to supply the compressed air into the premixed air-fuel mixture passage from a radially inner side towards a radially outer side, and
a main fuel injection port to inject the fuel from an axially upstream side into the inner main air passage, further comprising a guide air supply passage to inject the compressed air into the inner main air passage from an axially upstream side so as to follow along the fuel flow from the main fuel injection port.

3. A fuel injector comprising:
a pilot fuel injector configured to inject the fuel into a combustion chamber;
a main fuel injector provided coaxially with the pilot fuel injector so as to surround the pilot fuel injector and configured to have a main flow path to generate a premixed air-fuel mixture,
the main flow path including an outer main air passage, located radially outwardly and configured to supply a compressed air in an axial direction into an annular premixed air-fuel mixture passage, and an inner main air passage located radially inwardly and configured to supply the compressed air into the premixed air-fuel mixture passage from a radially inner side;
a main fuel injection port to inject the fuel from an axially upstream side into the inner main air passage;
a guide air supply passage to inject the compressed air into the inner main air passage from an axially upstream side so as to follow along the fuel flow from the main fuel injection port; and
a main fuel injection block that defines the main fuel injection port, the main fuel injection block being located so as to confront an axially extending throughhole defined in an upstream side wall of the inner main air passage, wherein the guide air supply passage is formed as a gap delimited between the main fuel injection block and the throughhole.

4. The fuel injector as claimed in claim 1, wherein a plurality of the main fuel injection ports are located along a circumferential direction.

5. The fuel injector as claimed in claim 1, further comprising an inner main swirler located in the inner main air passage to swirl the compressed air about a longitudinal axis.

6. The fuel injector as claimed in claim 1, further comprising an outer main swirler located in the outer main air passage to swirl the compressed air about a longitudinal axis.

* * * * *

UNITED STATES PATENT AND TRADEMARK OFFICE
CERTIFICATE OF CORRECTION

PATENT NO. : 9,109,553 B2  
APPLICATION NO. : 13/908578  
DATED : August 18, 2015  
INVENTOR(S) : Ryusuke Matsuyama et al.

Page 1 of 1

It is certified that error appears in the above-identified patent and that said Letters Patent is hereby corrected as shown below:

Title page, item (72) Inventors:

Delete "Masayoshi Kobayashi (Akashi, JP)"

Insert --Masayoshi Kobayashi (Kobe, JP)--

Signed and Sealed this
Second Day of August, 2016

Michelle K. Lee
*Director of the United States Patent and Trademark Office*